Feb. 21, 1950 R. W. JOHNSON 2,498,426
CATADIOPTRIC REFLEX REFLECTING LENS
Filed March 24, 1947
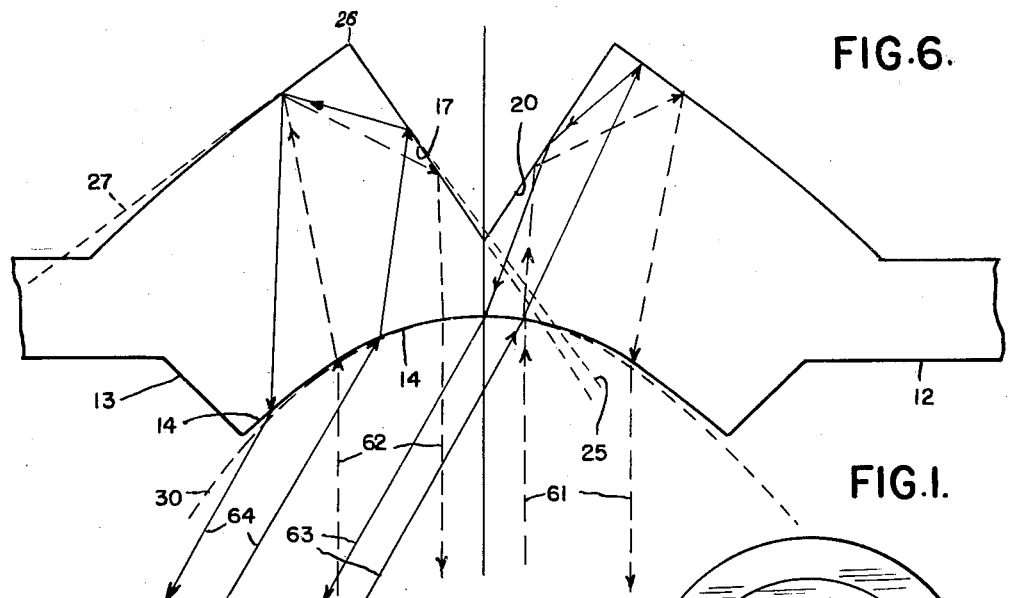
FIG.6.
FIG.1.
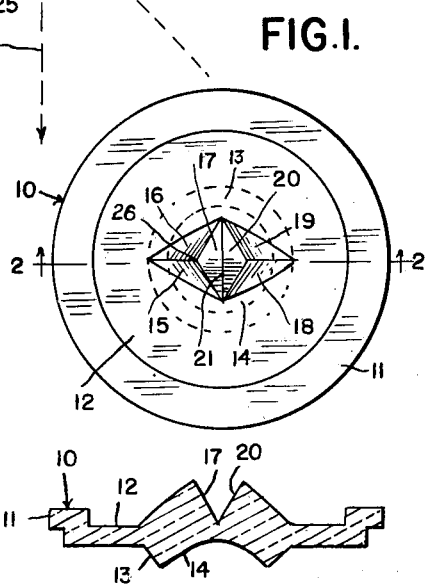
FIG.2.
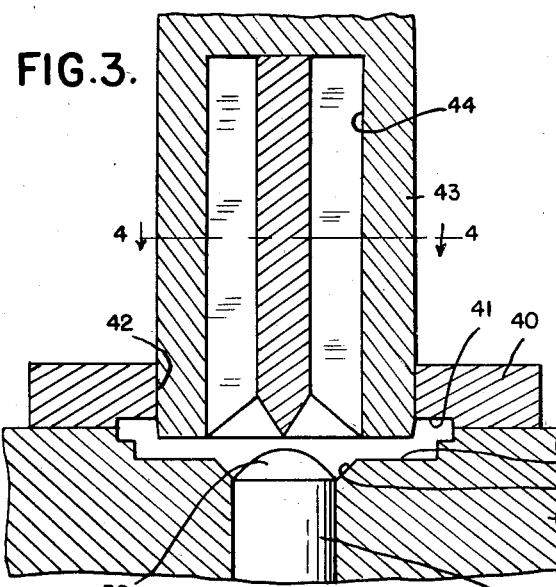
FIG.3.
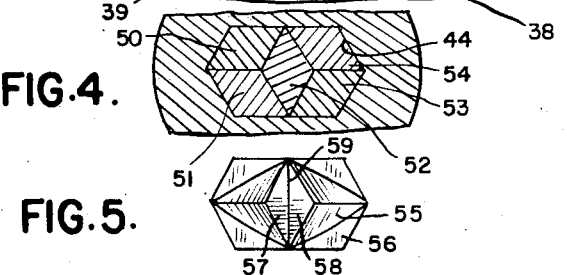
FIG.4.
FIG.5.
INVENTOR.
ROY W. JOHNSON
BY
Whittemore, Hulbert
& Belknap ATTORNEYS Patented Feb. 21, 1950

2,498,426

UNITED STATES PATENT OFFICE 2,498,426

CATADIOPTRIC REFLEX REFLECTING LENS

Roy W. Johnson, Detroit, Mich.

Application March 24, 1947, Serial No. 736,666

11 Claims. (Cl. 88—82)

1

The present invention relates to a reflecting lens and more particularly to a catadioptric lens effective to return an incident light ray after double refraction and reflection along a path substantially parallel to the incident ray.

It is an object of the present invention to provide a catadioptric reflex reflecting lens characterized by the provision of a concave refracting surface at its front face cooperating with one or more reflecting systems approximating tetrahedral corners.

More specifically, it is an object of the present invention to provide a catadioptric reflex reflecting lens having a concave refracting surface at its front face and a reflecting system composed of six reflecting surfaces arranged in groups of three each, each group of which approximates a tetrahedral corner.

Other objects and features of the invention will become apparent as the description proceeds, especially when considered in conjunction with the accompanying drawings, wherein:

Figure 1 is a plan view of the lens;

Figure 2 is a section on the line 2—2 of Figure 1;

Figure 3 is a longitudinal section of a press and die elements for forming the lens;

Figure 4 is a fragmentary section on the line 4—4 of Figure 3;

Figure 5 is an end elevation of the die elements assembled in the press; and

Figure 6 is a diagrammatic view showing the cross sectional shape of a lens constructed in accordance with the present invention, the cross sectional shape corresponding to the sectional view of Figure 5.

Referring now to Figures 1 and 2, the lens 10 is illustrated as of generally circular formation having an attaching flange 11, an annular flat center portion 12, a forwardly projecting, conically shaped portion 13, a concave refracting surface 14 and rear approximately but not exactly flat reflecting portions 15, 16, 17, 18, 19 and 20. It will be observed that each of the approximately flat reflecting portions 15, 16 and 17 is generally perpendicular to both of the other two reflecting surfaces. Surfaces 18, 19 and 20 are similarly related. Furthermore, surfaces 17 and 20 intersect to define the line indicated at 21 in Figure 1. As will be readily apparent from the drawings, the axes of symmetry of the tetrahedral corners, which pass through the intersection point of their surfaces, are parallel to each other.

The precise shape of the surfaces is best understood by reference to Figure 6. In this figure the reflecting surface 17 is actually a portion of a spherical surface which is tangent to a plane 25 at a point 26. Two other imaginary plane surfaces, each of which is perpendicular to the imaginary surface 25 and to the other plane surface, intersect along a straight line 27 and the reflecting surfaces 15 and 16 are tangent to these last mentioned plane surfaces, the point of tangency being the point 26 previously defined. The radius of curvature of the spherical surfaces 18, 19 and 20 is relatively large so that in the portions of these surfaces appearing in the lens the surfaces do not deviate substantially from a plane surface. However, the optical effect of the deviation from the plane surface is very important and the radius of curvature of the spherical surfaces is related to the curvature of the concave refracting surfaces 14 so as to give a maximum reflex reflecting action of incident rays throughout a wide angle of incidence. Attention is directed to the fact that the spherical reflecting surfaces 15 to 20 are concavely presented to the incident ray.

The concave refracting surface 14 approximates a hyperbola but is modified therefrom so that the portions away from the center or axis thereof lie outside of an imaginary hyperbola whose trace is indicated at the dotted line 30. In other words, the curvature of the refracting surface 14 follows closely an imaginary hyperbola at its central portion but approaching its periphery the curvature of the refracting portion 14 is of increasingly longer radius or of increasingly less curvature.

The optical shape of the concave refracting surface 14 is such that parallel rays of light impinging upon it in a direction parallel with the center line of the optical system are refracted in substantially conical formation and the spherical radius used to describe the grouped reflecting surfaces, such as 18, 19 and 20 are so disposed and determined as to return the rays toward the refracting surface 14 in substantially the same conical formation.

Referring to Figure 1, it will be observed that the six reflecting surfaces 15 to 20 inclusive together occupy a generally quadrilateral area having corners of 60° and 120°. This area is located symmetrically with respect to the concave refracting surface 14 so that the axis thereof is coplanar with and midway between the axes of symmetry of said tetrahedral corners. Figures 1 to 6 illustrate a preferred form of the lens, in which the major diagonal of the quadrilateral area is slightly longer than the diameter of the concave refracting surface 14 and the minor diagonal (represented by the line 21 in Figure 1) is somewhat shorter than the diameter of the concave refracting surface 14. It is to be understood, however, that these proportions may be altered by practical requirements affecting the thickness of the flat portion 12 without in any way affecting the scope of this invention. In any case, however, the diameter of the refracting surface should be greater than the distance between the axes of symmetry of the tetrahedral corners.

Specifically, a preferred embodiment of the present invention comprises a lens whose outside diameter is 2⅝ inches. The radius of curvature of the spherical surfaces 15 through 20 is 5.884 inches. As previously stated, these spherical surfaces are tangent at the apex of an imaginary tetrahedral corner at the point 26. The concave refracting lens, which as previously stated approximates a hyperbola, has a curvature represented by the following table, in which the X dimension is along the axis of the lens and the Y dimension is in the direction perpendicular thereto. This table also includes the slope of the normal to the curve at the points defined.

| X | Y | Slope of Normal |
|---|---|---|
| 0.0000 | 0.0000 | 0° 0' |
| 0.0048 | 0.0589 | 9° 21' |
| 0.0188 | 0.1163 | 17° 52' |
| 0.0388 | 0.1674 | 24° 30' |
| 0.0638 | 0.2155 | 29° 35' |
| 0.0968 | 0.2696 | 33° 15' |
| 0.1328 | 0.3213 | 35° 30' |
| 0.1734 | 0.3750 | 38° 20' |
| 0.1984 | 0.4063 | 39° 30' |
| 0.2172 | 0.4300 | 40° 30' |

The actual operation of the lens may be understood by reference to Figure 6 which shows light rays 61 and 62 entering and leaving the lens parallel with the center line of its optical system, and light rays 63 and 64 entering and leaving the lens at a wide angle to the center line of its optical system. Such rays as 62 and 64, for example, are first refracted by concave surface 14 following which they are reflected from all three of the surfaces 15, 16 and 17, or 18, 19 and 20, and finally are refracted again by surface 14 upon leaving the lens.

Rays 63 and 64 illustrate the ability of the lens to reflect rays at wider angles of incidence than is possible with other types of lenses which employ tetrahedral reflectors or approximate tetrahedral reflectors. In other lenses the reflecting surfaces corresponding to surfaces 17 and 20 are so positioned that wide angled rays impinging upon them exceed the limits of total internal reflection and are thereby caused to pass through the lens instead of being reflected and returned in the direction from which they came. Ray 64 in Figure 6 shows that surface 20, and surface 17 in the opposite sense, are juxtaposed in relation to concave surface 14 in such a manner that refraction at the said surface 14 tends to maintain the rays in total reflecting relation to surfaces 20 and 17 over a wide angle of incidence.

It has been found that this lens may conveniently be formed in a pressing operation when the lens is formed of a material such as methyl methacrylate, which is widely known under its trade name "Lucite."

A convenient method of producing these lenses with high precision and with ease and economy of manufacture is illustrated in Figures 3 to 5. In these figures a recessed die 35 is provided with die surfaces 36 conforming to the front surface of the lens, including a conical portion 37 which forms the conical surface 13 of the lens. A pin 38 whose upper surface 39 has been carefully machined to the desired curvature of the concave refracting surface 14 is mounted in the die. The upper die portion comprises a plate 40 having die surfaces 41 shaped to cooperate with correspondingly formed portions of the die 35 to form the flange 11. The plate 40 is provided with an opening 42 located centrally therein and received within the opening 42 is a cup 43 having an internal chamber 44 accurately fashioned to have the hexagonal shape illustrated best in Figure 4. Five pins 50, 51, 52, 53 and 54 are provided, these pins having their end surfaces ground to the appropriate shape to form the reflecting surfaces 15, 16, 17, 18, 19 and 20. Pins 50, 51, 53 and 54 each include a concave spherical portion 55 and a flat portion 56. The central pin 52 is provided at opposite sides with identical concave spherical surfaces 57 and 58, these surfaces meeting to define the line 59 which reproduces the line 21 in the lens previously defined. It will be observed that each of the pins 50 to 54 are of diamond shaped cross section having acute angles of 60° and obtuse angles of 120°, and interfit to fill the hexagonal chamber 44.

All of the pins 50 to 54 may conveniently be ground with their ends in contact at the proper angle to a spherical grinding element and assembled in the relationship illustrated to form a very accurate die whose accuracy is fully reproduced in the finished product.

While the specific dimensions of a preferred embodiment of the present reflex reflecting lens have been given, it will be understood that this is merely an example and that of course dimensions of the lens may be modified as desired so long as the optical relationship and cooperation of refracting and reflecting surfaces are not changed. It will further be understood that while specific dimensions have been given for a preferred embodiment of the lens, certain advantages result from the arrangement of surfaces without reference to the exact or approximate relative dimensions of parts. Thus, for example, one of the principal advantages of the present reflex reflecting lenses resides in the provision of a concave refracting surface which obviously requires less material than would otherwise be the case; and, more important, which reduces the length of the path of an incident ray of light through the material of the lens. This last is very important and contributes greatly to the high percentage of incident light which is returned within a useful zone adjacent the source.

While there is illustrated and described in specific detail a preferred construction of an improved catadioptric reflex reflecting lens and apparatus for producing the same, it will be understood that this has been done merely to enable those skilled in the art to practice the invention, the scope of which is indicated by the appended claims.

What I claim as my invention is:

1. A catadioptric lens having a rear surface provided with two forwardly facing tetrahedral corners having a common side boundary, each of said tetrahedral corners composed of three concavely curved forwardly reflecting surfaces intersecting at a common point or apex, the axes of symmetry of said tetrahedral corners being parallel, the front face of said lens having a single concavely curved front refracting surface whose axis is coplanar with and midway between the axes of symmetry of said tetrahedral corners, said corners and refracting surface being mutually optically cooperative to act as an autocollimating device.

2. A catadioptric lens having a rear surface provided with two forwardly facing tetrahedral corners having a common side boundary, each of said tetrahedral corners composed of three concavely curved forwardly reflecting surfaces intersecting at a common point or apex, the concavely curved reflecting surfaces of each tetrahedral corner being spherical surfaces, the axes of symmetry of said tetrahedral corners being parallel, the front face of said lens having a single concavely curved front refracting surface whose axis is coplanar with and midway between the axes of symmetry of said tetrahedral corners, said corners and refracting surface being mutually optically cooperative to act as an autocollimating device.

3. A catadioptric lens having a rear surface provided with two forwardly facing tetrahedral corners having a common side boundary, each of said tetrahedral corners composed of three concavely curved forwardly reflecting surfaces intersecting at a common point or apex, the concavely curved reflecting surfaces of each tetrahedral corner being spherical surfaces, and being tangent to planes which intersect at said apex and which are mutually normal to each other, the axes of symmetry of said tetrahedral corners being parallel, the front face of said lens having a single concavely curved front refracting surface whose axis is coplanar with and midway between the axes of symmetry of said tetrahedral corners, said corners and refracting surface being mutually optically cooperative to act as an autocollimating device.

4. A catadioptric lens having a rear surface provided with two forwardly facing tetrahedral corners having a common side boundary, each of said tetrahedral corners composed of three concavely curved forwardly reflecting surfaces intersecting at a common point or apex, the axes of symmetry of said tetrahedral corners being parallel, the front face of said lens having a single concavely curved front refracting surface whose axis is coplanar with and midway between the axes of symmetry of said tetrahedral corners, said refracting surface being approximately hyperbolic, said corners and refracting surface being mutually optically cooperative to act as an autocollimating device.

5. A catadioptric lens having a rear surface provided with two forwardly facing tetrahedral corners having a common side boundary, each of said tetrahedral corners composed of three concavely curved forwardly reflecting surfaces intersecting at a common point or apex, the axes of symmetry of said tetrahedral corners being parallel, the front face of said lens having a single concavely curved front refracting surface whose axis is coplanar with and midway between the axes of symmetry of said tetrahedral corners, said refracting surface being approximately hyperbolic but modified therefrom to have a curvature of more rapidly increasing radius away from its center, said corners and refracting surface being mutually optically cooperative to act as an autocollimating device.

6. A catadioptric lens having a rear surface provided with two forwardly facing tetrahedral corners having a common side boundary, each of said tetrahedral corners composed of three concavely curved forwardly reflecting surfaces intersecting at a common point or apex, the concavely curved reflecting surfaces of each tetrahedral corner being spherical surfaces, and being tangent to planes which intersect at said apex and which are mutually normal to each other, the axes of symmetry of said tetrahedral corners being parallel, the front face of said lens having a single concavely curved front refracting surface whose axis is coplanar with and midway between the axes of symmetry of said tetrahedral corners, said refracting surface being approximately hyperbolic but modified therefrom to have a curvature of more rapidly increasing radius away from its center, said corners and refracting surface being mutually optically cooperative to act as an autocollimating device.

7. A catadioptric lens having a rear surface provided with two forwardly facing tetrahedral corners having a common side boundary, each of said tetrahedral corners composed of three concavely curved forwardly reflecting surfaces intersecting at a common point or apex, the concavely curved reflecting surfaces of each tetrahedral corner being spherical surfaces and being tangent to planes which intersect at said apex and which are mutually normal to each other, the axes of symmetry of said tetrahedral corners being parallel, the front face of said lens having a single concavely curved front refracting surface whose axis is coplanar with and midway between the axes of symmetry of said tetrahedral corners, said refracting surface being approximately hyperbolic but modified therefrom to have a curvature of more rapidly increasing radius away from the center, said corners and refracting surface being mutually optically cooperative to act as an autocollimating device, the radius of curvature of said spherical surfaces being several times greater than the average radius of curvature of said refracting surface.

8. A catadioptric lens having a rear surface provided with two forwardly facing tetrahedral corners having a common side boundary, each of said tetrahedral corners composed of three concavely curved forwardly reflecting surfaces intersecting at a common point or apex, the concavely curved reflecting surfaces of each tetrahedral corner being spherical surfaces, having a radius of approximately 5.884 units, the axes of symmetry of said tetrahedral corners being parallel, the front face of said lens having a single concavely curved front refracting surface whose axis is coplanar with and midway between the axes of symmetry of said tetrahedral corners, said refracting surface being a surface of revolutions of a curve whose coordinates in said units are substantially:

| X | Y | Slope of Normal |
|---|---|---|
| 0.0000 | 0.0000 | 0° 0′ |
| 0.0048 | 0.0589 | 9° 21′ |
| 0.0188 | 0.1163 | 17° 52′ |
| 0.0388 | 0.1674 | 24° 30′ |
| 0.0638 | 0.2155 | 29° 35′ |
| 0.0968 | 0.2696 | 33° 15′ |
| 0.1328 | 0.3213 | 35° 30′ |
| 0.1734 | 0.3750 | 38° 20′ |
| 0.1984 | 0.4063 | 39° 30′ |
| 0.2172 | 0.4300 | 40° 30′ | where the X dimensions are taken along the axis of said surface and the Y dimensions are taken perpendicular to said X dimensions, and the slope of the normal is taken as the angle between the axis and the line normal to the curve at the points designated by the respective sets of X and Y coordinates, said corners and refracting surface being mutually optically cooperative to act as an autocollimating device.

9. A catadioptric lens having a rear surface provided with two forwardly facing tetrahedral corners having a common side boundary, each of said tetrahedral corners composed of three concavely curved forwardly reflecting surfaces intersecting at a common point or apex, the axes of symmetry of said tetrahedral corners being parallel, the front face of said lens having a single concavely curved front refracting surface whose axis is coplanar with and midway between the axes of symmetry of said tetrahedral corners, said refracting surface having a diameter greater than the distance between the axes of symmetry of said tetrahedral corners, said corners and refracting surface being mutually optically cooperative to act as an autocollimating device.

10. A catadioptric lens having a rear surface provided with two forwardly facing tetrahedral corners having a common side boundary, each of said tetrahedral corners composed of three concavely curved forwardly reflecting surfaces intersecting at a common point or apex, the axes of symmetry of said tetrahedral corners being parallel, the front face of said lens having a single concavely curved front refracting surface whose axis is coplanar with and midway between the axes of symmetry of said tetrahedral corners, said refracting surface having a diameter greater than the minor diagonal of the assembly of said tetrahedral corners, said corners and refracting surface being mutually optically cooperative to act as an autocollimating device.

11. A catadioptric lens having a rear surface provided with two forwardly facing tetrahedral corners having a common side boundary, each of said tetrahedral corners composed of three concavely curved forwardly reflecting surfaces intersecting at a common point or apex, the concavely curved reflecting surfaces of each tetrahedral corner being spherical surfaces, having a radius of approximately 5.884 units, and being tangent to planes which intersect at said apex and which are mutually normal to each other, the axes of symmetry of said tetrahedral corners being parallel, the front face of said lens having a single concavely curved front refracting surface whose axis is coplanar with and midway between the axes of symmetry of said tetrahedral corners, said refracting surface being a surface of revolutions of a curve whose coordinates in said units are substantially:

| X | Y | Slope of Normal |
|---|---|---|
| 0.0000 | 0.0000 | 0° 0′ |
| 0.0048 | 0.0589 | 9° 21′ |
| 0.0188 | 0.1163 | 17° 52′ |
| 0.0388 | 0.1674 | 24° 30′ |
| 0.0638 | 0.2155 | 29° 35′ |
| 0.0968 | 0.2696 | 33° 15′ |
| 0.1328 | 0.3213 | 35° 30′ |
| 0.1734 | 0.3750 | 38° 20′ |
| 0.1984 | 0.4063 | 39° 30′ |
| 0.2172 | 0.4300 | 40° 30′ | where the X dimensions are taken along the axis of said surface and the Y dimensions are taken perpendicular to said X dimensions, and the slope of the normal is taken as the angle between the axis and the line normal to the curve at the points designated by the respective sets of X and Y coordinates, said corners and refracting surface being mutually optically cooperative to act as an autocollimating device.

ROY W. JOHNSON.

REFERENCES CITED

The following references are of record in the file of this patent:

UNITED STATES PATENTS

| Number | Name | Date |
|---|---|---|
| 1,671,086 | Stimson | May 22, 1928 |

FOREIGN PATENTS

| Number | Country | Date |
|---|---|---|
| 194,064 | Great Britain | Mar. 8, 1923 |
| 662,374 | France | Mar. 19, 1929 |
| 332,134 | Great Britain | July 17, 1930 |
| 37,730 | France | Oct. 28, 1930 |
| | (Addition to 662,374) | |
| 354,533 | Great Britain | Aug. 13, 1931 |
| 732,573 | France | June 20, 1932 |

OTHER REFERENCES

Van Lear, "Reflectors Used in Highway Signs and Warning Signals," article in Journal of Optical Society of America, vol. 30, October 1940, pps. 462–471, publ. by American Institute of Physics, New York, New York.